June 10, 1969 R. L. EDWARDS ETAL 3,449,011
HEAD REST AND WASTE CONTAINER ASSEMBLY
Filed June 23, 1967 Sheet 1 of 2
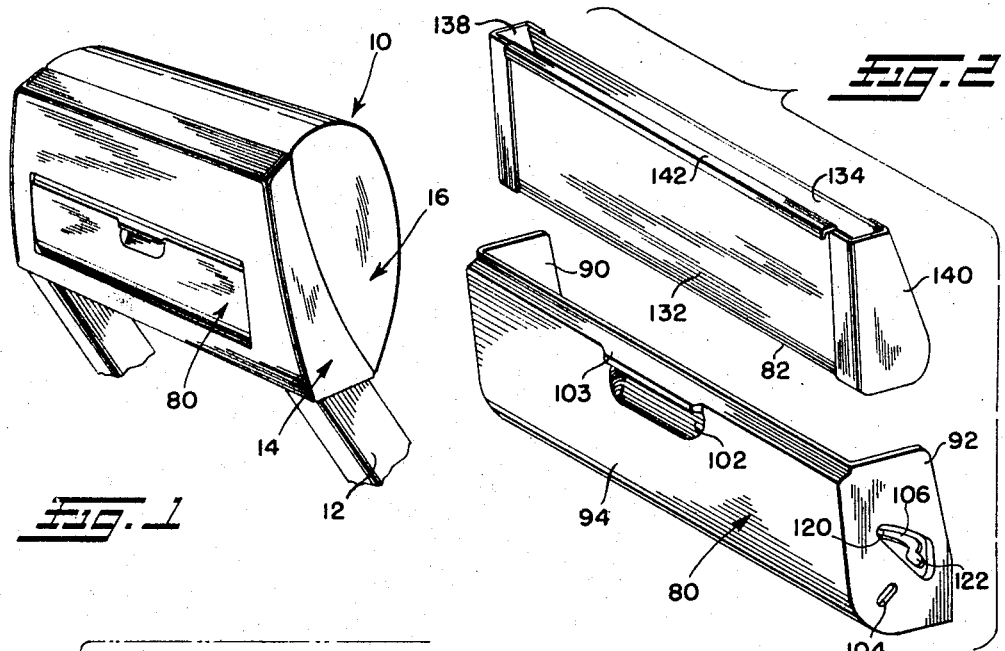
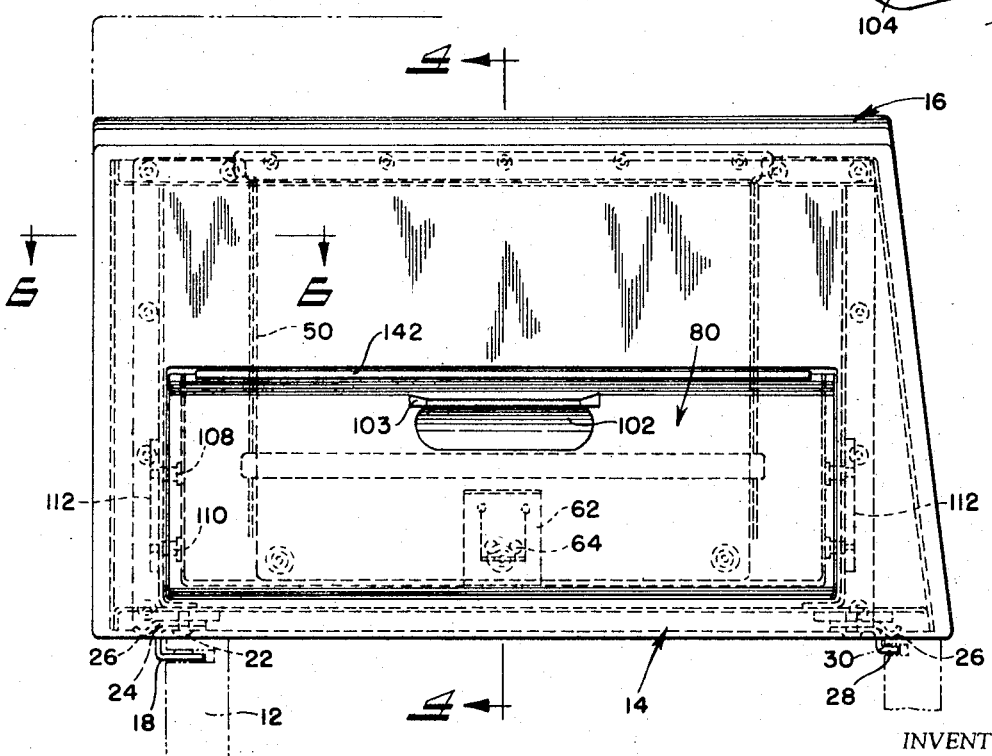
INVENTORS
GEORGE F. GIELOW
ROBERT L. EDWARDS
BY
Oberlin, Maky, Donnelly & Renner
ATTORNEYS

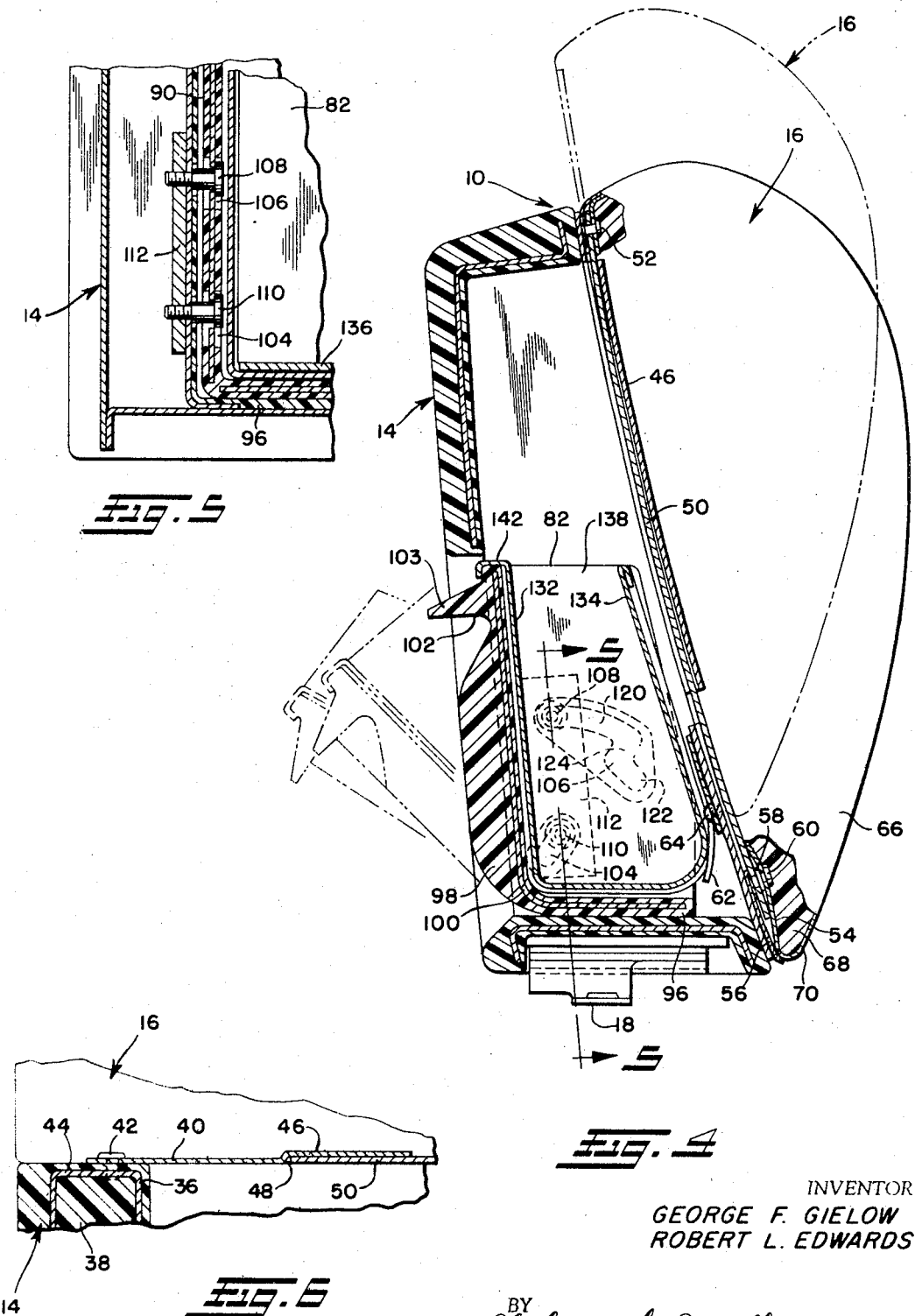

United States Patent Office 3,449,011
Patented June 10, 1969

3,449,011
HEAD REST AND WASTE CONTAINER ASSEMBLY
Robert L. Edwards and George F. Gielow, Mansfield, Ohio, assignors to Artnell Company, Chicago, Ill., a corporation of Delaware
Filed June 23, 1967, Ser. No. 648,301
Int. Cl. A47c 7/38, 7/62; A61g 15/00
U.S. Cl. 297—391                                    10 Claims

ABSTRACT OF THE DISCLOSURE

A combination head rest and waste container wherein the container includes a separate receptacle adapted to be hidden when not in use and movable to an exposed position for either filling the same or for temporarily removing the same entirely from the container for emptying and/or cleaning the same.

---

This invention relates as indicated to a head rest and waste container assembly having particularly advantageous use in transportation vehichles such as intercity buses and the like.

In intercity transportation vehicles, the scheduled travel time to the destination is frequently several hours or longer, and the passengers' comfort and convenience is therefore a primary consideration in the design of seating equipment for such vehicles. This should be contrasted with buses designed essentially for urban travel where the passengers remain on the bus relatively brief periods of time, with the comfort and convenience of the passengers therefore not being nearly as significant a problem.

In intercity vehicles of the type described, each seat is normally provided with a pillow rest against which the passenger can place his head for additional comfort. A waste pocket or receptacle is frequently associated with the back of each seat into which the passenger can place items to be subsequently thrown away during the servicing of the vehicle following arrival thereof at the destination. However, these pockets are usually of limited capacity and present a distinct cleaning problem when continually exposed to newspapers, food and other materials.

With the above in mind, a primary object of the present invention is to provide a head rest and waste container assembly which is highly attractive in appearance and which can be quickly and easily mounted at the top of the passenger seat.

A further object of the invention is to provide a waste container which includes a liner or insert which can be removed during servicing for cleaning or replacement.

A still further object of the present invention is to provide a waste container pivotally mounted for movement between a position substantially flush with the exposed rear face of the assembly thereby to present an attractive appearance when not in use, to an outwardly pivoted position for use.

A still further object of the present invention is to provide such an assembly wherein the head rest is mounted for vertical adjustment to more comfortably accommodate the seat occupant.

These and other objects will be apparent as the description proceeds.

To the acomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary perspective view of the head rest and waste container assembly of the present invention, showing the same in installed condition on the top of the vehicle seat;

FIG. 2 is a fragmentary, exploded view of the waste container and receptacle or liner associated therewith;

FIG. 3 is a front elevational view of the assembly as seen by the passenger using the same;

FIG. 4 is a vertical sectional view taken on line 3—3 of FIG. 3;

FIG. 5 is a sectional view taken on line 5—5 of FIG. 4; and

FIG. 6 is a sectional view taken on line 6—6 of FIG. 3.

Referring now in more detail to the drawings, wherein like parts are indicated by like reference numerals, and initially to FIG. 1, the head rest and waste container assembly of the present invention is generally indicated at 10 and is adapted to be mounted removably at the upper end of seat 12 the details of which form no part of the present invention. The assembly 10 includes a housing generally indicated at 14 which mounts the waste container, and a pillow section generally indicated at 16 which is removably mounted on the housing section 14.

Referring to FIG. 3, the assembly 10 is mounted on the seat 12 by means of mounting clips 18 and 20, each of which is attached to the housing 14 by mounting bolts commonly designated at 22 which also extend through mounting plates commonly designated at 24 disposed contiguously to the under surface of the housing.

It will be noted that the plate 24, shown rightmost in FIG. 3, is formed with a curved free end portion 26 which defines with the laterally directed end 28 of the mounting clip 20 a channel for receiving the slotted upper end 30 of the seat 12. The opposite mounting clip 18 is generally U-shaped and defines between the opposed leg portions thereof a channel for receiving in a similar manner the upper, slotted end 32 of the seat 12. The assembly 10 can be removably secured to the seat 12 in any suitable manner.

The housing 14 comprises a metal core 36, FIG. 6, and a surrounding section of foam or like material 38, with the latter providing a cushioning affect in the event of sudden forward movement of the passenger occupying the seat behind. The open, inner end of the housing 14 is closed by a panel 40 which is secured to the housing section by a plurality of rivets or the like commonly designated at 42 which are received in the adjacent flange section 44 of the metal core 36.

The panel 40 is offset transversely of its width as indicated at 46 to form a slot 48 for slidably receiving and frictionally retaining the slide panel 50 of the pillow section 16. The latter, referring to FIG. 4, is secured at its upper end to the pillow section by rivets 52 or the like. The bottom of the slide panel 50 extends between the cover 54 and the cover flap 56, with the panel 50 carrying a male fastener 58 cooperable with a female fastener 60 carried by the pillow section 16 thereby to retain the pillow section on the housing 14. However, because of the slidable connection between the pillow section 16 and the housing, the former can be vertically adjusted relative to the latter, and frictionally retained in such adjusted position, with the pillow section being shown in dashed lines in FIG. 4 in a relatively raised position.

A resilient leaf spring member 62 is attached to the panel 40 by rivets 64 or the like, with such member resiliently engaging the waste container assembly and urging the same to a closed position.

The pillow 66 itself is formed with a foam core 68 and a plastic or fabric cover 70. It will be understood that a removable pillow cover is normally carried by the pillow section and capable of ready displacement during servicing of the vehicle.

Referring now to the waste container assembly, the same comprises a pivotally mounted door generally indicated at 80 and an inner removable waste container or receptacle 82, with these members being shown separated in FIG. 2. The door 80 comprises opposed walls 90 and 92, a front wall 94, and bottom wall 96. Referring to FIG. 4, the door is preferably of molded plastic material 98 formed around a metal core 100, with the front 94 being relatively thick to enhance the cushioning effect. The front 94 is formed with a central recess 102 partially defining a handle portion 103 to facilitate grasping of the door by the passenger using the same.

Each side wall 90 and 92 of the door 80 is formed with a pivot opening 104 and a curved slot 106 for receiving pairs of upper and lower pivot pins 108 and 110, respectively, mounted at either side of the housing section 14. In FIG. 5. The pins 108 and 110 are threaded at their leading ends for attachment to mounting plates 112 carried by the housing 14. The heads of the rivets are diametrically larger than the width of the openings 104 and slots 106 thereby to retain the door pivotally mounted on the housing section 14.

The door 80 is pivoted about the pins 110 between the solid and dashed line positions thereof as shown in FIG. 4, with the length of the slots 106 controlling the openmost position of the door. It will be noted that the slots 106 are generally Z-shaped, comprising generally parallel upper and lower slot sections, 120 and 122, respectively, and a connecting section 124. The slot sections 120 and 122, coupled with the elongated pin openings 104, permit movement of the door 80 to a fully open position, shown by the leftmost dashed lines in FIG. 4, to permit removal of the inner receptacle or liner 82.

The liner 82 comprises a continuous, generally U-shaped body section 130 including front and back walls 132 and 134, and a bottom connecting wall 136. End caps 138 and 140 are telescoped over and secured to the respective ends of the body section thereby to form therewith an open top receptacle. The front wall 132 of the body section 130 is provided with an L-shaped flange 142 adapted to snap over the top surface of the front 94 of the door 80 immediately above the recess 102, as shown in FIG. 4. The liner is thereby temporarily retained in a use position, with the bottom of the liner resting on the bottom wall 96 of the door. As shown in FIG. 5, the length of the liner 82 is such as to space the same within the side walls of the door 80 in spaced relation thereto.

Referring now to the normal use of the waste container assembly, the same when not in use is pushed inwardly so that the door 80 is generally flush with the surrounding portions of the housing 14, as shown in solid lines in FIG. 4. When it is desired by the passenger using the same to discard material into the receptacle, the door 80 is pulled outwardly by grasping the handle 103 and moved about an axis through the pins 110 to a position wherein the pins 108 engage the ends of the slot sections 120, which engagement restrains further movement of the door by the passenger using the same. This position is shown in the first, or rightmost, dashed line position of the door in FIG. 4. In such position of the door, the liner 82 cannot physically be removed from the door owing to the size of the opening defined by the door and the lowermost face of the adjacent section of the housing 14. When the refuse has been placed in the liner 82, the door is closed.

When it is desired by maintenance personnel to remove the liner 82 for emptying or replacing the same, the door is pulled outwardly to its first dashed line position as above described. The door is then lifted upwardly in a direction parallel to the inclination of the pivot openings 104 and slot sections 124 thereby moving the pins 108 and 110 to the lower portions of the pin openings 104 and slot sections 124. In such raised position, the door can be pivoted further outwardly, the pins 108 riding in the slot sections 122 until engaging the ends of the same. In such outermost pivoted position, the opening between the top of the door and the adjacent surface of the housing 14 is sufficiently large to permit removal of the liner 82 for cleaning or replacement of the same. The liner can be removed simply by grasping the same by the top flange 142 thereof and lifting the same outwardly. The liner 82 can be replaced and the door 80 moved to its normal use position by reversing the described procedure.

The door 80 is biased to its flush position by leaf spring 62, which resiliently engages the lower region of the liner 82 thereby biasing the same, and thus the door 80, clockwise, as viewed in FIG. 4, about the axis through the pins 110.

It will thus be seen that the assembly of the present invention uniquely combines a head rest and waste container into a single, attractive assembly removably mounted at the top of the vehicle seat. The head rest is vertically adjustable relative to the assembly housing to accommodate passenger comfort, and the waste container is pivotally mounted for movement between a position substantially flush with the housing and a first open position wherein waste material can be placed therein. When moved to a second open position, the container liner can be removed by maintenance personnel for cleaning or replacement.

Other modes of applying the principle in the invention may be employed, change being made as regards the details described, provided the features stated in any of the following claims, or the equivalent of such, be employed.

We therefore particularly point out and distinctly claim as our invention:

1. A head rest and waste container assembly comprising a housing, a head rest removably mounted on said housing, a door, means for pivotally mounting said door on said housing for movement between a closed position substantially flush with the said housing and an open position exposing the interior of said door, and linear means disposed within said door for receiving waste material, said liner being readily removable from said door to facilitate cleaning or replacement of said liner; said means for mounting said door comprising guide pins carried by said housing, said door being formed with slot means for permitting outward pivotal movement of said door to a first position exposing said liner for reception of waste material and a second position permitting complete removal of said liner from said door; said slot means comprising a pair of generally Z-shaped slots formed in the side walls of said door, the upper and lower sections of said slots being radially offset from the pivotal axis of said door, with the ends of said offset sections limiting the pivotal movement of said door when moved to said first and second positions.

2. A head rest and waste container assembly comprising a housing, a head rest removably mounted on said housing, a door, means for pivotally mounting said door on said housing for movement between a closed position substantially flush with the said housing and an open position exposing the interior of said door, and liner means disposed within said door for receiving waste material, said liner being readily removable from said door to facilitate cleaning or replacement of said liner; and means for frictionally mounting said head rest on said housing for vertical adjustment relative thereto, said frictional mounting means comprising a panel carried by said housing, said panel being centrally offset to form a transverse slot for receiving tab means carried by said head rest, said tab means frictionally engaging said panel in the region of said slot for retaining said head rest in the vertically adjusted position thereof.

3. A head rest and waste container assembly comprising a housing, a head rest removably mounted on said housing, a door, means for pivotally mounting said door on said housing for movement between a closed position substantially flush with the said housing and an open position exposing the interior of said door, and liner means disposed within said door for receiving waste material, said liner being readily removable from said door to facilitate cleaning or replacement of said liner; and means for retaining said door and said liner in a first open position for receiving refuse but not permitting removal of said liner and a second open position permitting removal of said liner for cleaning or replacement of the same, said retaining means comprising guide pins carried by said housing and a generally Z-shaped slot adapted to receive said guide pins, said housing being further formed with elongated pivot openings to permit movement of said guide pins to the radially spaced sections of said Z-shaped slot.

4. A head rest and waste container assembly comprising a housing, a head rest removably mounted on said housing, a door, means for pivotally mounting said door on said housing for movement between a closed position substantially flush with the said housing and an open position exposing the interior of said door, and liner means disposed within said door for receiving waste material, said liner being readily removable from said door to facilitate cleaning or replacement of said liner; said means for mounting said door including guide pins carried by said housing, the opposed side walls of said door being formed with a generally Z-shaped slot having upper and lower sections radially offset from the pivotal axis of said door, the ends of said offset sections limiting the pivotal movement of said door when moved to said first and second open positions.

5. A head rest and waste container assembly comprising a housing, a head rest mounted on said housing, a door, means for pivotally mounting said door on said housing for movement between a closed position substantially flush with the said housing and an open position exposing the interior of said door, and liner means disposed within said door for receiving waste material, said liner being readily removable from said door to facilitate cleaning or replacement of said liner, said means for mounting said door comprising slot and pin means for permitting outward pivotal movement of said door to a first position exposing said liner for reception of waste material and a second position permitting complete removal of said liner from said door.

6. The assembly of claim 1 wherein said pins further include pivot pins extending through elongated pin openings formed in the side walls of said door, said pivot pins moving in said elongated slots when said door is vertically moved to reposition said guide pins in either of said upper and lower slot sections.

7. The assembly of claim 5 further including means for frictionally mounting said head rest on said housing for vertical adjustment relative thereto.

8. The assembly of claim 5 further including means for retaining said door and said liner in a first open position for receiving refuse but not permitting removal of said liner and a second open position permitting removal of said liner for cleaning or replacement of the same.

9. The assembly of claim 4 wherein said means for mounting said door further includes pivot pins extending through elongated pin openings formed in said side walls of said door, said pivot pins moving in said elongated slots when said door is vertically moved to reposition said guide pins in either of said upper and lower slot sections.

10. The assembly of claim 9 further including biasing means for retaining said door in a flush position.

References Cited

UNITED STATES PATENTS

| | | | |
|---|---|---|---|
| 2,383,125 | 8/1945 | Hill | 297—191 X |
| 2,404,109 | 7/1946 | Steele | 297—391 X |
| 2,648,516 | 8/1953 | Manetti et al. | 312—248 X |
| 2,771,209 | 11/1956 | Flynn | 220—18 |
| 2,812,097 | 11/1957 | Legge | 312—248 X |
| 3,027,194 | 3/1962 | Rumptz | 297—410 |
| 3,039,642 | 6/1962 | Perkins | 220—18 |
| 3,254,918 | 6/1966 | Barker | 297—410 X |
| 3,366,417 | 1/1968 | Belk | 297—397 |

FOREIGN PATENTS 26,073    8/1896    Great Britain.

CASMIR A. NUNBERG, *Primary Examiner.*

U.S. Cl. X.R.

297—217, 410